United States Patent [19]
Kashima

[11] 4,369,999
[45] Jan. 25, 1983

[54] SADDLE FOR BICYCLE
[75] Inventor: Tetsuo Kashima, Osaka, Japan
[73] Assignee: Kashima Saddle Mfg. Co., Ltd., Osaka, Japan
[21] Appl. No.: 184,901
[22] Filed: Sep. 8, 1980

Related U.S. Application Data
[63] Continuation of Ser. No. 926,028, Jul. 19, 1978, abandoned.

[30] Foreign Application Priority Data
Apr. 18, 1978 [JP] Japan .................................. 53-51502

[51] Int. Cl.³ .............................................. B62J 1/00
[52] U.S. Cl. ................................ 297/195; 248/219.2; 403/373
[58] Field of Search .................... 297/195, 219, 215; 248/219.2, 230; 24/81 BA; 403/361, 373, 244; 52/301; 138/95, 96

[56] References Cited
U.S. PATENT DOCUMENTS

| 459,845 | 9/1891 | Thomas | 24/249 LS |
| 753,237 | 3/1904 | Claflin | 52/301 X |
| 2,647,715 | 8/1953 | Garrison | 248/219.2 |
| 2,710,207 | 6/1955 | Mueller | 403/373 |
| 3,992,054 | 11/1976 | Compagnolo . | |
| 4,026,600 | 5/1977 | Kutaguchi | 297/214 |

FOREIGN PATENT DOCUMENTS

| 1203082 | 7/1959 | France . | |
| 1409418 | 7/1965 | France . | |
| 2303700 | 3/1975 | France | 297/195 |
| 447097 | 10/1948 | Italy | 403/373 |
| 448220 | 3/1949 | Italy . | |
| 17139 | 2/1908 | United Kingdom | 403/373 |

Primary Examiner—James T. McCall
Assistant Examiner—Peter A. Aschenbrenner
Attorney, Agent, or Firm—Richards, Harris & Medlock

[57] ABSTRACT

A loop clip attached to the rear side of a saddle includes a clip band which is fittable to the upper end of a straight seat pillar of a bicycle and formed with a stopper positionable over the clip opening for passing the seat pillar therethrough. When the saddle is fastened to the seat pillar, the stopper bears on the upper end of the seat pillar to prevent the seat pillar from slipping upward from the loop clip.

7 Claims, 8 Drawing Figures

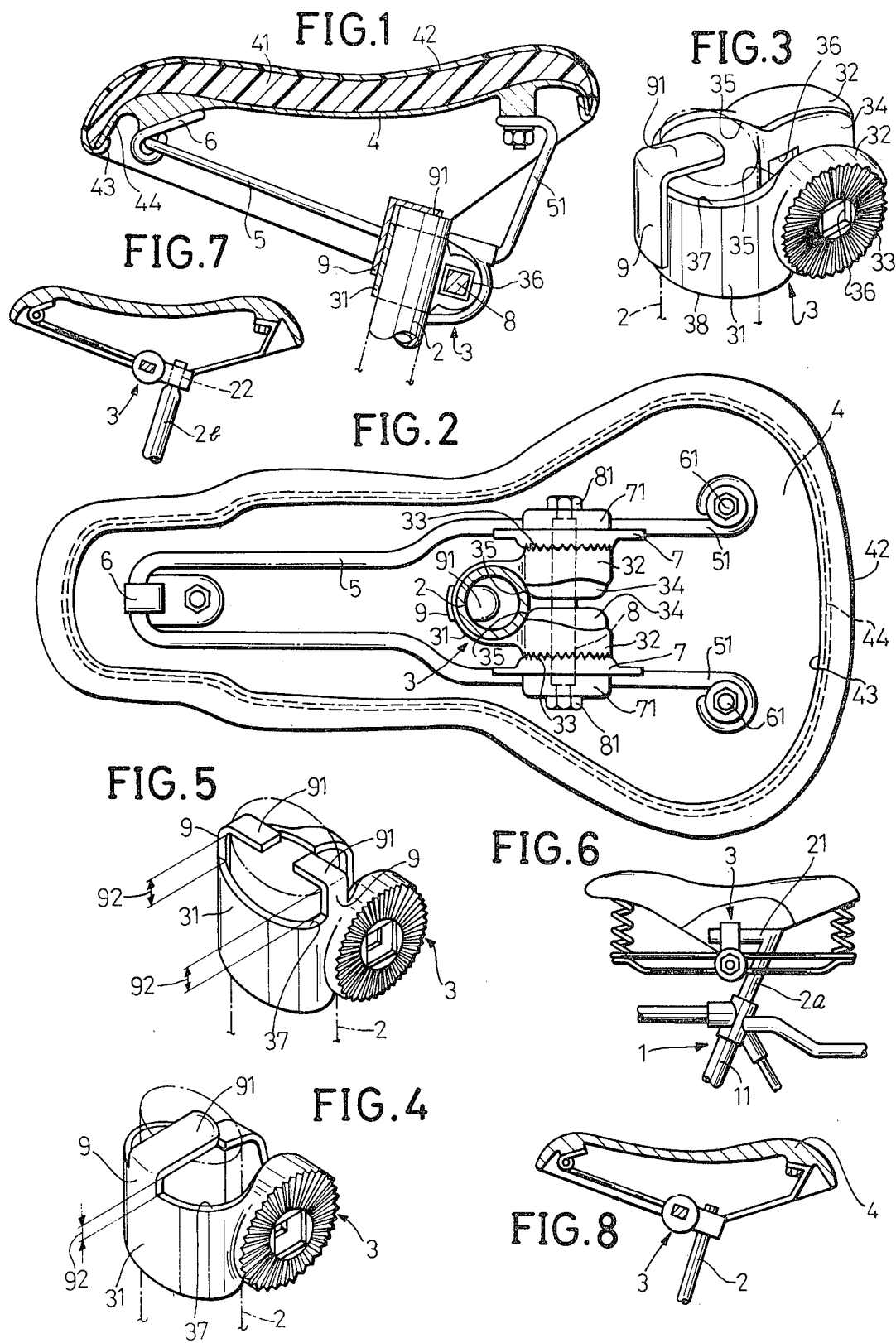

SADDLE FOR BICYCLE

This is a continuation of application Ser. No. 926,028 filed July 19, 1978, now abandoned.

BACKGROUND OF THE INVENTION

It is important to render bicycles lightweight to ensure reduced running resistance and greater ease of handling. It is therefore required to provide a saddle having a reduced weight but retaining the desired strength by using parts of improved quality and construction. Accordingly the saddle mount shown in FIG. 7 for mounting the saddle on the frame has been introduced into use in place of the mount shown in FIG. 6.

The mount shown in FIG. 6 includes a seat pillar 2a extending from the seat tube 11 of a frame 1 and having a horizontal upper end 21 to which a loop clip 3 on the saddle is fitted and fastened. With the mount shown in FIG. 7, a loop clip 3 on the saddle is fitted and fastened to a small-diameter portion 22 at the upper end of a seat pillar 2b.

Seemingly the latter seat pillar is lighter than the former by an amount corresponding to the weight of the horizontal portion 2a of the former, but the small-diameter portion 22 of the latter, even when designed to have the smallest possible diameter and wall thickness required for the desired strength, necessitates a seat pillar which is larger than is desirable. Thus the overall weight involved will not be in any way smaller.

Accordingly it has been proposed to support the saddle on a seat pillar 2 in the form of a straight pipe of uniform wall thickness and having the desired strength by a loop clip 3 fitting around and tightly fastened to the pillar 2 as seen in FIG. 8. Although fully useful under usual conditions, the seat pillar 2 still involves problems when used under severe racing conditions as in bicycle moto cross in which riders must drive the bicycle over various obstacles on the track to compete in cycling techniques and time. Stated more specifically, the moment when the bicycle with the rider thereon strikes the ground after jumping over a sloping obstacle, an impact acts on the saddle which is merely fastened to the straight seat pillar 2 by the loop clip 3 fitting therearound, possibly causing the clip 3 to slide on the seat pillar 2 and permitting the top end of the pillar to damage the saddle top 4 or forcing the rider's body directly against the seat pillar 2. Thus the proposed saddle assembly is not usable with safety.

SUMMARY OF THE INVENTION

In view of the problems heretofore encountered, the object of this invention is to provide a saddle for a bicycle including a loop clip having a stopper attached to the upper end of the loop clip and projecting into an extension of the clip opening through which the seat pillar extends so as to ensure safety for the rider even when the seat pillar is subjected to impact.

BRIEF DESCRIPTION OF THE DRAWINGS

FIG. 1 is a view in vertical section showing a saddle of this invention;

FIG. 2 is a bottom view showing the saddle;

FIG. 3 is a perspective view showing a loop clip;

FIGS. 4 and 5 are perspective views showing other embodiments of loop clip; and

FIGS. 6, 7 and 8 are sectional views showing conventional saddles.

DETAILED DESCRIPTION OF THE INVENTION

With reference to FIGS. 1 and 2 showing a saddle of this invention, a saddle main body 4 made from synthetic resin by injection molding has a cushion member 41 adhered to the top surface of the body and a waterproof cover 42 covering the cushion member 41. The outer peripheral edge 43 of the cover 42 is inwardly folded over the flange 44 of the main body 4. A base wire 5 provided under the main body 4 has a head which is secured to a front portion of the main body 4 by a holder 6 and opposite legs 51 which are secured to rear side portions of the main body 4 by bolts 61. Opposed inner clip washers 7 are disposed inside the base wire 5 approximately at the midportion thereof. Outer clip washers 71 are fitted to the inner clip washers 7 from outside the base wire 5 with the base wire 5 extending between each mating pair of the washers 7 and 71. A clip bolt 8 extending through the outer clip washers 71 supports a loop clip 3 thereon.

As seen in FIGS. 2 and 3, the loop clip 3 comprises a semicircular clip band 31 fittable around a seat pillar 2 and holding portions 32 extending from the opposite ends of the clip band 31 and opposed to each other. The holding portions 32 are provided on their outer sides with bearing surfaces 33 engageable with the inner clip washers 7. The holding portions 32 are formed on their inner sides with bulging surfaces 34 bulging toward each other in the center. The portions 35 of the bulging surfaces 34 adjacent the clip band 31 are curved in the form of a circular arc and are fittable around the seat pillar 2. The bolt 8 extends through aligned square holes 36 formed in the bearing surfaces 33 and bulging surfaces 34 centrally thereof.

The present invention is characterized in that the clip band 31 of the loop clip 3 has a stopper 9. The stopper 9 is made from a rectangular plate having a slightly larger thickness than the clip band 31 by bending the upper end of the plate at a right angle to provide an abutting piece 91. The stopper 9 is fixed at its lower portion to the outer peripheral midportion of the clip band 31 by spot welding, with the abutting piece 91 directed inwardly of the clip band 31 and positioned about 7 mm above the upper edge 37 of the band 31.

The saddle of this invention is mounted on a bicycle by fitting the loop clip 3 onto the upper end of the straight seat pillar 2 of the bicycle with the abutting piece 91 of the stopper 9 in contact with the upper end, and screwing nuts 81 on the threaded ends (not shown) of the clip bolt 8 to force the bulging surfaces 34 of the loop clip 3 toward each other and to thereby press the clip band 31 and the circular arc surfaces 35 of the holding portions 32 against the outer periphery of the seat pillar 2.

The fastening force of the loop clip 3, which effectively acts on the upper and lower edges 37 and 38 of the clip band 31, is exerted on the outer periphery of the seat pillar 2 whose upper end is positioned above the upper edge 37 of the clip band 31. Moreover, since the upper end of the seat pillar 2 bears against the abutting piece 91 on the clip band 31, the seat pillar 2, despite the straight outer periphery thereof, will not slip on the loop clip 3 even when the saddle is subjected to a downwardly acting load.

Accordingly even when an impact acts on the saddle during cycling on a track which includes many slopes and involves severe conditions as in bicycle moto cross, the seat pillar 2 will not damage the saddle main body 4 or injure the rider by direct contact of the pillar with the hip of the rider.

Further because the saddle of this invention is adapted for use with a seat pillar which is in the form of a straight pipe of uniform wall thickness, the saddle mount of this invention is more lightweight than in the case of the conventional seat pillar 2a provided with a horizontal portion 21 or of the seat pillar 2b having a small-diameter portion formed from a large pipe end. Additionally, the present saddle does not require the procedure conventionally needed for the welding of the horizontal portion 21 or for the drawing of the small-diameter portion 22.

FIGS. 4 and 5 show other embodiments of the stopper provided on the loop clip 3. The stopper 9 shown in FIG. 4 is formed by extending the midportion of a clip band 31 upward from its upper edge and bending the extension inwardly of the clip band 31 at a right angle to provide an abutting piece 91. The abutting piece 91 is spaced from the upper edge 37 of the clip band 31 by a distance 92 which is about 7 mm.

FIG. 5 shows stoppers 9 which are formed by extending the opposite ends of a clip band 31 upward from its upper edge and bending the extensions inwardly of the clip band 31 toward each other at a right angle to provide abutting pieces 91. The abutting pieces 91 are spaced from the upper edge 37 of the clip band 31 by a distance 92 which is similarly about 7 mm.

The two loop clips 3 shown in FIGS. 4 and 5 are used in the same manner as the previous embodiment. The clip band 31, when fitted around the seat pillar 2, is prevented from slipping by the abutting piece(s) 91 bearing on the upper end of the seat pillar 2. The stopper 9, which is integral with the clip band 31, can be formed without the necessity of spot welding. One of the stoppers 9 formed on the loop clip 3 of FIG. 5 can be dispensed with.

This invention is of course useful for the saddle shown in FIG. 6 and provided with spring means as well as for various other saddles which are adapted to be secured to the seat pillar 2 with a loop clip.

The scope of this invention is not limited to the description given above with reference to the accompanying drawings but various modifications can be made with ease by one skilled in the art without departing from the spirit of this invention. Such modifications are included within the scope of the invention.

What I claim is:

1. A saddle support for securing a saddle to the top of a seat pillar having first and second opposed clip washers for engagement with a loop clip, the loop clip comprising a clip band fittable around a seat pillar of a uniform diameter and having an upper end profile, a stopper formed on and extending from an upper portion of the clip band, first and second holding portions extending from opposite ends of the clip band and opposed to each other, each of the holding portions having a curved portion in the form of a circular arc and fittable around the seat pillar on its inner side and a bearing surface on its outer side for engagement with one of the clip washers to hold the saddle in a selected position, the stopper comprising a plurality of tabs each directed inwardly of the clip band and extending toward each other and spaced above the clip band over the upper end profile of the seat pillar, each tab projecting substantially to the center of the seat pillar, the stopper positionable over the upper end of the seat pillar to cover a substantial portion thereof such that downward slippage of the loop clip relative the seat pillar is thereby prevented.

2. A saddle support as defined in claim 1 wherein each of said tabs is a rectangular plate having an upper end inwardly bent at a right angle and serving as an abutting piece, the plate having a lower end secured to the outer periphery of the clip band by spot welding.

3. A saddle support as defined in claim 1 wherein each of said tabs is an extension of the clip band including a lower end extending upward from part of the upper edge of the clip band and including an inwardly bent upper end.

4. A saddle support as defined in claim 1 wherein the stopper is a finger-like extension having a width less than the width of the seat pillar.

5. A saddle as defined in claim 1 wherein the stopper is a finger-like extension having a first section extending upwardly from the clip band and a second section extending inwardly of the clip band over the upper end of the seat pillar and terminating within the upwardly extended profile of the seat pillar, said first section having side edges extending rectilinearly parallel to each other and to the seat pillar along their entire upward extension and defining a width therebetween less than the width of the seat pillar.

6. A bicycle saddle loop clip with a clip band fittable around a seat pillar of uniform diameter, a stopper formed on and extending from an upper portion of the clip band and having an upper end profile, first and second holding portions extending from opposite sides of the clip band and opposed to each other, each of the holding portions having a curved portion in the form of a circular arc and fittable around the seat pillar on its inner side and a bearing surface on its outer side and having a square hole formed therein aligned with the hole in the opposed holding portion, the stopper comprising a plurality of tabs each directed inwardly of the clip band and extending toward each other and spaced above the clip and over the upper end profile of the seat pillar, each tab projecting substantially to the center of the seat pillar, the stopper positionable over the upper end of the seat pillar, the bearing surfaces of the first and second holding portions being below the stopper such that the stopper prevents upward motion of the seat pillar relative the loop clip when the stopper abuts the upper end of the seat pillar.

7. The invention according to claim 6 wherein the stopper terminates within the upwardly extended profile of the seat pillar and has a width less than that of the seat pillar.

* * * * *

UNITED STATES PATENT AND TRADEMARK OFFICE
CERTIFICATE OF CORRECTION

PATENT NO. : 4,369,999
DATED : January 25, 1983
INVENTOR(S) : Tetsuo Kashima

It is certified that error appears in the above—identified patent and that said Letters Patent is hereby corrected as shown below:

Column 4, lines 23 and 24, delete "the stopper" and substitute --each of said tabs-- therefore.

Column 4, line 25, after "saddle" add --support--.

Column 4, line 25, delete "the stopper" and substitute --each of said tabs-- therefor.

Column 4, line 36, after "diameter" insert --and having an upper end profile--.

Column 4, lines 56 and 57, delete "the stopper" and substitute --each of said tabs-- therefor.

Signed and Sealed this

Twenty-eighth Day of June 1983

[SEAL]

Attest:

GERALD J. MOSSINGHOFF

Attesting Officer  Commissioner of Patents and Trademarks